(12) United States Patent
Filev et al.

(10) Patent No.: US 8,600,614 B2
(45) Date of Patent: Dec. 3, 2013

(54) SYSTEM AND METHOD FOR INTEGRATED CONTROL OF VEHICLE CONTROL SYSTEMS

(75) Inventors: Dimitar Petrov Filev, Novi, MI (US); Greg Stevens, Ann Arbor, MI (US); Jianbo Lu, Livonia, MI (US); Kwaku O. Prakah-Asante, Commerce Township, MI (US); Ilya Kolmanovsky, Novi, MI (US); Steven J. Szwabowski, Northville, MI (US); Stefano Di Cairano, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 13/021,745

(22) Filed: Feb. 5, 2011

(65) Prior Publication Data

US 2012/0203424 A1 Aug. 9, 2012

(51) Int. Cl.
*G06F 7/00* (2006.01)
*G06F 17/00* (2006.01)
*B60R 22/00* (2006.01)
*E05F 15/00* (2006.01)
*G05D 1/00* (2006.01)
*G05D 3/00* (2006.01)

(52) U.S. Cl.
USPC ........... 701/36; 701/48; 701/51; 701/57; 701/58; 701/65

(58) Field of Classification Search
USPC .................... 701/48, 51, 57, 58, 65
See application file for complete search history.

(56) References Cited

U.S. PATENT DOCUMENTS

| | | | |
|---|---|---|---|
| 6,855,090 B2 | 2/2005 | Tabata | |
| 6,879,898 B2 | 4/2005 | Ghoneim | |
| 7,124,027 B1 * | 10/2006 | Ernst et al. | 701/301 |
| 7,206,673 B2 * | 4/2007 | Yamamura et al. | 701/1 |
| 7,349,776 B2 | 3/2008 | Spillane | |
| 7,403,842 B2 * | 7/2008 | Yamamura et al. | 701/1 |
| 7,440,844 B2 * | 10/2008 | Barta et al. | 701/124 |
| 7,590,481 B2 | 9/2009 | Lu | |
| 7,783,426 B2 * | 8/2010 | Kato et al. | 701/300 |
| 7,904,221 B2 * | 3/2011 | Oikawa et al. | 701/37 |
| 8,116,915 B2 * | 2/2012 | Kempton | 700/291 |
| 8,155,843 B2 * | 4/2012 | Takeda | 701/48 |
| 8,155,868 B1 * | 4/2012 | Xing et al. | 701/123 |
| 8,346,456 B2 * | 1/2013 | Aleksic et al. | 701/98 |
| 2006/0052917 A1 * | 3/2006 | Schwarzhaupt et al. | 701/29 |

\* cited by examiner

*Primary Examiner* — Khoi Tran
*Assistant Examiner* — Nicholas Kiswanto
(74) *Attorney, Agent, or Firm* — Joseph E. Root

(57) ABSTRACT

A system and method for providing driving support system to a vehicle. The vehicle includes a set of control modules, having at least one operational setting, configured for electronically controlling the vehicle components. The system includes an integrated drive mode selection module having a set of drive modes for modifying the settings for each control module. A sensing system detects at least one condition associated with the driver, vehicle or surroundings. A controller determines an appropriate drive mode for the vehicle based on the condition and the output of a safety module that ensures that the drive mode is safe while driving.

9 Claims, 3 Drawing Sheets

SYSTEM AND METHOD FOR INTEGRATED CONTROL OF VEHICLE CONTROL SYSTEMS

BACKGROUND

This application relates generally to vehicle control systems and more particularly to integrated vehicle control systems.

Various vehicle subsystems are known to operate in different configuration modes to suit different conditions, which are changing in a long-term basis. For example, automatic transmissions can be controlled in sport, winter, economy, and manual configuration modes in which the changes between gear ratios and other subsystem control parameters are modified to suit the prevailing conditions or the driver's preferences. Air suspensions are known with on-road and off-road configuration modes. Power steering systems can be operated in different configurations modes where the level of assistance varies.

Conventionally, operation of each vehicle subsystem is controlled by the driver based on preference and experience. As the number of controllable subsystems increases, the driver may face an increasing number of choices of which configuration modes to select for each subsystem. In addition to the merely increasing the number of choices available, this situation also increases the potential for unexpected system interactions as well. Unless the driver is very experienced, this situation, being complicated can result in unintended vehicle behaviors.

Moreover, optimal vehicle performance relies on the control coordination among different configuration modes of the individual subsystems. For instance, brake control, active front steering, and active rear steering can all affect a vehicle's yaw stability. Thus, control coordination is required among these subsystems. In addition, the driver's preference should also be taken into account.

It would be highly desirable to develop an integrated vehicle control strategy that automatically determines an appropriate setting for each vehicle subsystem, and manages control coordination among the different settings.

SUMMARY

One embodiment of the present application describes a driving support system for a vehicle having a set of control modules configured for electronically controlling the vehicle components. Each control module includes at least one operational setting. The system includes an integrated drive mode selection module having a set of drive modes for modifying the settings for each of the control modules. A sensing system detects at least one condition associated with the driver, vehicle or surroundings. The system also includes a safety module that ensures that a selected drive mode is safe while driving. Further, a controller determines an appropriate drive mode for the vehicle through an input; the drive mode being selected based on the condition and the output of the safety module for the mode selected.

Another embodiment of the present application discloses a method for providing driving support in a vehicle having a set of control modules; each control module operational with at least one setting. An integrated drive mode selection module having a set of drive modes modifies the settings for each of the control modules. The method includes detecting a set of conditions associated with the driver, vehicle or surroundings and determining an appropriate drive mode for the vehicle based on the set of conditions. Upon a determination that the drive mode is safe for the vehicle and driver, the method includes activating the drive mode for operating the vehicle.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems providing integrated vehicle control. The system includes a number of vehicle control modules, each of which may employ multiple settings. Individual control modules are coupled to an integrated drive mode selection module having a set of drive modes, with settings that modify the behavior of the control modules. Settings may be altered individually by the driver, or the integrated drive mode selection module provides an automatic mode that can automatically determine and implement an appropriate mode of operation for each control module. Like the automatic mode, a proactive mode automatically determines the drive mode. That mode is recommended to the driver and then activated once the driver approves. The automatic and proactive modes determine the drive mode based on driver, vehicle, and surrounding conditions. Moreover, before activating the drive mode, the system ensures that the selected mode is safe for the vehicle and driver.

The present disclosure provides an integrated system for controlling vehicle control modules. The integrated system ensures that the drive mode selected meets safe driving requirements. It also facilitates accident avoidance, matches driver behavior and intent, and optimizes ride comfort and fuel economy.

Exemplary Embodiments

Figure 1:
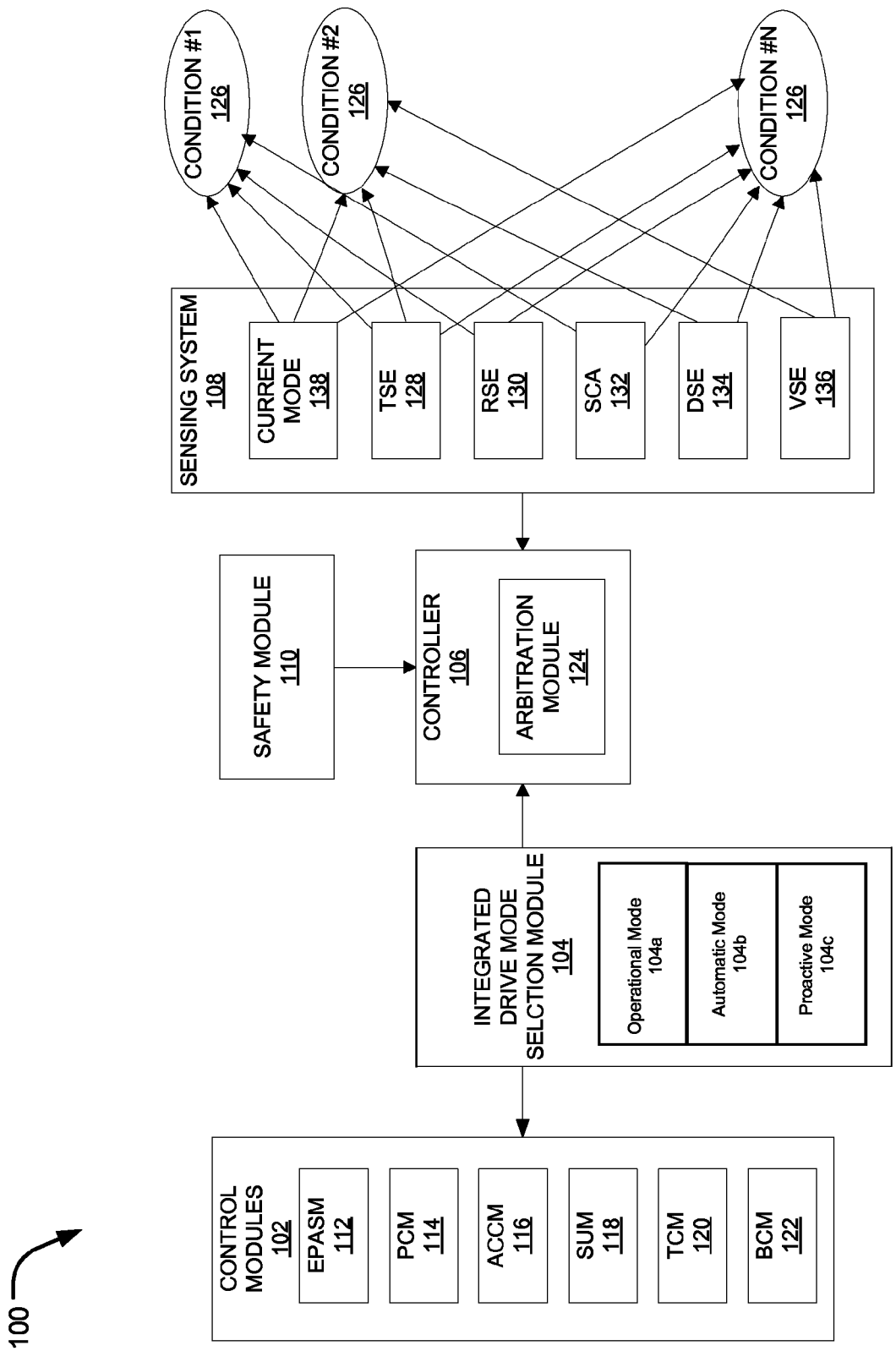
FIG. 1 is an exemplary integrated control system.

FIG. 1 illustrates an exemplary integrated vehicle control system 100. The system 100 includes a set of control modules 102 controlling vehicle components or subsystems; each control module may be switchable among different operational settings such as normal, comfort, and performance. To determine an appropriate setting for each control module 102, the present disclosure employs an integrated drive mode selection module 104 having a set of drive modes 104a, 104b, 104c including automatic, proactive, or other known drive modes. A driver may manually select one of the known drive modes, such as comfort, economy, or performance, and an appropriate corresponding setting is provided to the control modules 102. Alternatively, the driver may select the automatic or proactive mode where a controller 106 automatically determines the drive mode. To this end, the controller 106 is coupled to a sensing system 108 to identify a set of conditions associated with the driver, vehicle, and surroundings. These conditions assist in determining an appropriate drive mode. In addition, the system 100 includes a safety module 110 that ensures that the drive mode identified by the controller 106 is safe for the driver and vehicle.

The control modules 102 include vehicle subsystems that provide assistance during driving. Some of the known control modules 102 employed in the vehicle include an electronic power-steering assist system module EPASM 112, a power train control module PCM 114, an adaptive cruise control module ACCM 116, and a transmission control module TCM 120. The EPASM 112 is designed to use an electric motor to reduce effort by providing steering assist to the driver. PCMs 114 are conventional control modules employed by vehicles that generate power and facilitate control coordination between one or more of the engine, transmission, driveshaft, or final drive. Further, a module that automatically controls the speed of a vehicle is referred to as the ACCM 116. It should be understood that TCM 120 detects engine load and vehicle speed to decide a gear position to be established in the transmission. In addition, the system 100 includes other control modules 102 that provide assistance in controlling the suspension and brakes, referred to as a suspension control module SUM 118 and a brake control module BCM 122, respectively. For description purposes, the present disclosure illustrates only a limited number of control modules 102; it should be understood that the vehicle might include any of the numerous control systems known to those in the art.

In addition, each control module 102 may be switchable among two or more operational settings such that its behavior can be modified. In general, each control module 102 may present a set of settings such as comfort, normal, and sports. When driving at substantially low speed, the EPASM 112 should operate at comfort settings to reduce driver steering efforts. Medium speed requires normal settings, and a sports setting may be preferable for high speed driving. Based on the driving conditions, each control module 102 is required to switch to an appropriate mode setting through a corresponding actuator. Conventionally, the individual actuators are activated independently to adapt to the driving conditions, for example, SUM 118 adapts to a comfort mode when driving over a potholed, or rough road.

The present disclosure describes controlling the control modules 102 through the integrated drive mode selection module 104. The integrated drive mode selection module 104 manages coordination among the settings of the control modules 102 through a set of drive modes such as manual, comfort, performance, and other known modes known in the art. These modes are known in the art and will not be explained in detail in the present disclosure. The driver may manually select a desired drive mode through a user interface. The specific nature of the user interface will be governed by conventional design choices for controls and instruments in a specific vehicle. A low-cost, utilitarian vehicle might employ manual control such as pushbuttons. A vehicle aimed at a more style-conscious market could use a touchscreen system in either event, or with any other control systems, the user interface allows the driver to modify the settings for each control module 102. Further, the system includes a safety mode, which may not be subjected to driver's selection, but is automatically activated based on driver, vehicle and surrounding awareness, and ensures that the driver and vehicle are safe for the driving conditions. It should be evident that modifying the control module's settings should not impose a threat to the vehicle or driver. As a result, the safety mode overrides any driver's selected mode if the driver selected mode is not deemed as safe as the safety mode elected.

Apart from the known drive modes, the integrated drive mode selection module 104 includes an automatic mode 104*b* and a proactive mode 104*c*. Upon activating the automatic mode 104*b*, an appropriate drive mode is automatically determined and subsequently, an appropriate setting for each control module 102 is provided. To this end, the controller 106 utilizes a decision logic that monitors a set of conditions associated with the driver and surroundings to determine the drive mode. The decision logic provides context aware selection of the drive mode, which is optimal or most appropriate for the current driving conditions including driver's behavior, road condition, vehicle states, and the traffic scenarios. The decision logic is discussed in the following section in connection with FIG. 2. The proactive mode 104*c* works similar to the automatic mode 104*b*, but the determined drive mode is provided to the driver as a recommendation and activated once the driver approves.

Sensing system 108, such as sensors, monitors and detects information associated with the vehicle, driver, and surroundings. The sensing system 108 may include known detection, known computation or information generated from measuring devices employed in vehicles to gather data that may be used for current drive mode modification. The sensing system 108 may also gather information available through known vehicle subsystems, such as steering systems, parking assistance system, and navigation system.

The controller 106 may be a microprocessor based control system adapted for actively controlling the control modules 102. The controller 106 may include appropriate input and output circuits of a known type for receiving input signals and for transmitting the various commands to the actuators associated with the control modules 102. Sensing system 108 provides detected information to the controller 106, and the driver provides mode preferences to the controller 106 through the integration drive mode selection module 104. Using these inputs, the controller 106 determines an appropriate drive mode. An arbitration module 124 performs this determination step using the decision logic.

The controller 106 utilizes the output of the sensing system 108 to estimate data associated with the driver, vehicle and surroundings. The controller estimations may broadly include, but are not limited to, traffic state estimation (heavy, normal, low) 128, road state estimation (surface, grade, highway, or city road) 130, safety condition assessment 132, driver state estimation 134, and vehicle state estimation 136. Another parameter that may affect drive mode selection is the current mode 138.

Driver state estimation 134 refers to the determination of information regarding the driver's driving state such as driving workload, behavior (cautious, economical, sporty), intent (understeer, oversteer or neutral turning, straight line driving, etc), and vehicle control capabilities (age, experience, expertise). To provide driving comfort, driver's state information is gathered to identify the drive mode that may be preferred by the driver. It should be understood that driver's state may be estimated by observing the frequency of driver's control applications and the dynamic response of the vehicle and its subsystems under the influence of the driver's control applications. The driver's control applications could be any one or more of braking, steering, throttling, and shifting. Moreover, surrounding conditions might be observed to define driver's workload; for example, heavy traffic and snowfall may induce high workload on the driver. In addition, a line of sight sensor may be utilized to identify driver's attentiveness or control capabilities. For example, a driver looking away from the current driving lane determines control capabilities. A driver driving in one lane with constant speed without shifting gear may be identified as an experienced driver and may not be under high workload, for example.

Vehicle state estimation 136 refers to the vehicle information that may be gathered through different sensors, measuring devices, and control modules employed in the vehicle. Some of the examples of the vehicle state include speed, wheel alignment, fuel, and tire pressure. It should be understood that the safety condition assessment 132 includes identification of any condition or state that may pose safety risks to the passengers in the vehicle. For instance, during high speed driving on a dense traffic area, sudden switch of powertrain mode, steering mode, etc., might lead to accidents. While driving on snow and icy roads, the vehicle is likely to meet unstable vehicle dynamic conditions that might worsen with switching modes. The safety condition assessment 132 aims to identify those conditions where safe driving might be compromised by mode switching.

Based on the driver, vehicle and surrounding information, the controller 106 identifies a set of driving conditions 126, situations that may potentially require a particular setting for one or more control modules 102. As shown, the driving conditions 126 refer to conditions associated with one of the estimated categories or a combination of the categories. For example, a rough road may be categorized as a driving condition that might demand a comfort setting for the SUM 118 to isolate the vehicle body from the road disturbance, a performance setting for the PCM 114 such that the vehicle has enough power to overcome traction loss due to road roughness. In another implementation, a combination of traffic state and road state may be referred to as a driving condition, which demands several controls to coordinate to certain settings.

Those skilled in the art will appreciate that driving conditions 126 keep changing with variations in surroundings, vehicle state, and the driver intent and behavior, and subsequently, the controller 106 automatically identifies an appropriate drive mode for the current driving condition. It should be understood that the conditions 126 include long term characterization of the associated vehicle subsystems, surrounding, or the driver that may be identified by considering average trends, patterns, or responses experienced. Moreover, these conditions 126 may not be sensitive to the sudden changes in short durations. For example, a long rough road with potholes having small patches of smooth road still will be considered rough road.

In addition, the system 100 includes the safety module 110 that ensures that a selected drive mode is safe for the current or near future driving conditions. In case the driver manually selects a drive mode, which is not deemed as safe based on the estimation from the safety condition assessment 132, the safety module 110 will override the manually selected mode and replace it with a safe mode or prevent the modification of current drive mode. The safety module 110 can also initiate mode modification upon a determination that the current drive mode is not safe when the current driving condition changes. For example, upon heavy traffic detected by the TSE 128 using indications that the adjacent lances have moving vehicles close to the vehicle, the safety module 110 may modify the setting for the EPASM 112 to minimum assistance mode to discourage the driver to conduct lane changes; namely, the driver needs to apply extra effort to change lanes. This is a precautionary measure to avoid accidents during heavy traffic conditions due to nuisance driver steering wheel angle inputs. The safety module 110 may either switch modes automatically based on the criticality of the condition or may prompt the driver to switch to a selected mode.

Further, once a drive mode is selected manually or through the automatic mode 104b, it should be understood that the mode modification needs to be performed at an appropriate moment. The safety module 110 allows mode modification at the appropriate moment that is safe, based on the driver and vehicle current state. For example, the automatic mode 104b may determine switching the current drive mode to sports mode; however, the safety module 110 may defer this modification if the vehicle is conducting a critical maneuver. Since, shifting mode at a critical maneuver might confuse the driver such that the driver misunderstands the driving condition or is distracted to conduct the maneuver. Shifting mode under the other high workload conditions may also distract the driver away from the main task.

Figure 2:
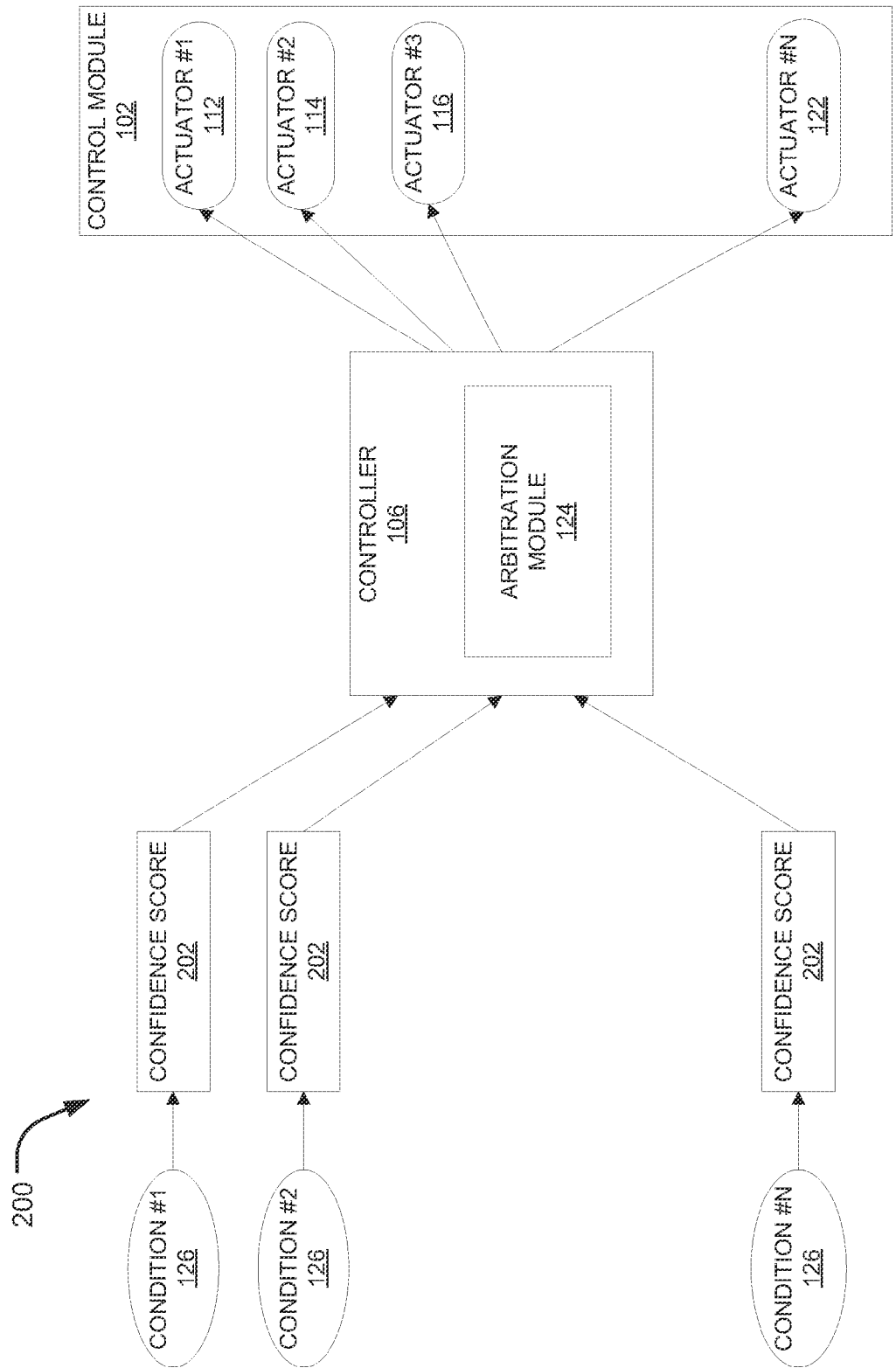
FIG. 2 illustrates exemplary decision logic to determine an appropriate drive mode for the vehicle.

FIG. 2 illustrates an exemplary decision logic 200 to determine an appropriate drive mode for the vehicle. In case the driver selects the automatic mode 104b or proactive mode 104c, the controller 106 (FIG. 1) determines the appropriate drive mode using the decision logic 200. The decision logic 200 may be implemented in the system 100 discussed in connection with FIG. 1; those skilled in the art, however, will understand that other systems may be anticipated for controlling the vehicle subsystems through an integrated means.

As discussed in FIG. 1, the controller 106 estimates the set of driving conditions 126 captured through the sensor 108. The decision logic 200 ensures that any criteria or conditions that may affect the mode selection process are taken into account. Driver state estimation 134 is a relevant factor that should be considered as the system 100 ensures that the mode selected enhances driving conditions. To this end, driver's intent, preferences, and behavior need to be monitored. Those skilled in the art will understand that the vehicle state and the surrounding information are other factors that are required to identify a suitable mode. FIG. 2 depicts some of these driving conditions 126 that the arbitration module 126 monitors.

For each driving condition 126, the controller 106 determines an intermediate drive mode and the corresponding settings for one or more control modules 102. For example, high traffic state may result in assigning normal mode to the EPASM 112. Further, heavy traffic with driver's intention to change lanes may assign a comfort mode setting for the EPASM 112 to facilitate the driver's steering and a normal setting for the SUM 118 to improve the responsiveness of the vehicle.

Based on the intermediate drive modes, the arbitration module 124 computes an overall mode and corresponding settings for each control module 102. To this end, the arbitration module 124 computes a confidence score 202 associated with the intermediate drive mode. In addition, the arbitration module 124 may compute a confidence score for the rest of the modes available for the control module 102. The confidence score 202 refers to the confidence established by arbitration module 124 in assigning the selected mode for the particular driving condition 126 and as a result, the probability of occurrence of the mode may depend on the confidence score 202. The confidence score 202 may be computed based on the criticality or sensitivity of the driving condition 126. For example, based on the driver's intent and if the road condition is bumpy, the comfort mode may be the most appropriate choice for the suspension system. The confidence score for this mode may be high, such as 90%, implying that it is highly recommended. As a result, the confidence score for other settings, such as normal, economy, etc., may become substantially low, for example as 30% and 20%, respectively. Assigning the scores 202 to all the available modes for each condition 126 assists in understanding the priority of the modes recommended by the condition 126.

Subsequently, the arbitration module 124 computes an overall drive mode and individual settings for the control modules 102. To this end, the arbitration module 124 evaluates the confidence score 202 associated with the intermediate mode recommended by each condition 126. In addition, the confidence score assigned to the rest of the modes by each condition 126 is evaluated to identify the criticality of the intermediate mode determined for each condition 126. In case the difference is high, the condition 126 may strongly recommend the intermediate mode. Subsequently, the recommendations and scores 202 provided by each condition 126 is combined to evaluate the overall mode. The combination process may be dependent on the prioritization associated with each condition 126 for mode identification. For example, the mode recommended by the safety condition assessment 132 may gain priority over the mode recommended by the driver state estimation 134. It should be understood that any known merging algorithm may be utilized by the arbitration module 124. In an implementation of the present disclosure, the arbitration module 124 may perform a weighted means or an average of these scores to determine the overall driving mode.

Subsequently, the arbitration module 124 transmits commands to individual actuators of the control modules 102 to provide the operational settings. The arbitration module 124 may identify a common setting for each control module 102. Alternatively, an individual setting may be provided to each control module 102 based on the confidence score 202. The arbitration module 124 ensures that appropriate coordination among the settings for each control modules 102 is maintained to avoid conflict settings. In safety critical situation, however, the arbitration module 124 may allow conflicting settings for the control modules 102. For example, sporty steering and throttling for escaping from a crash in eco-driver mode is enabled.

In an implementation of the present disclosure, each driving condition 126 may pertain to specific sensor estimation. For example, a complex driving condition may be identified that refers to road state estimation only, such as rough road with a slope, local road with pot holes and having a grade, and a highway road. Evaluating a set of such driving conditions 126 may result in identification of a common setting for all the relevant control modules 102.

In another implementation of the present disclosure, each driving condition 126 may combine a set of sensor estimates pertaining to a particular control module 102. For example, a complex driving condition associated with the braking control module 122 may include road condition, traffic condition, and driver intent. Evaluating a set of driving conditions 126 associated with one particular control module 102 results in assigning an appropriate setting to that control module only. The set of driving conditions 126 related to one control module 102 results in assigning an appropriate setting to that control module. As a result, each control module 102 may be assigned a different setting. It should be, however, understood that the driving condition may also refer to a set of sensor estimates and a group of control modules 102.

Figure 3:
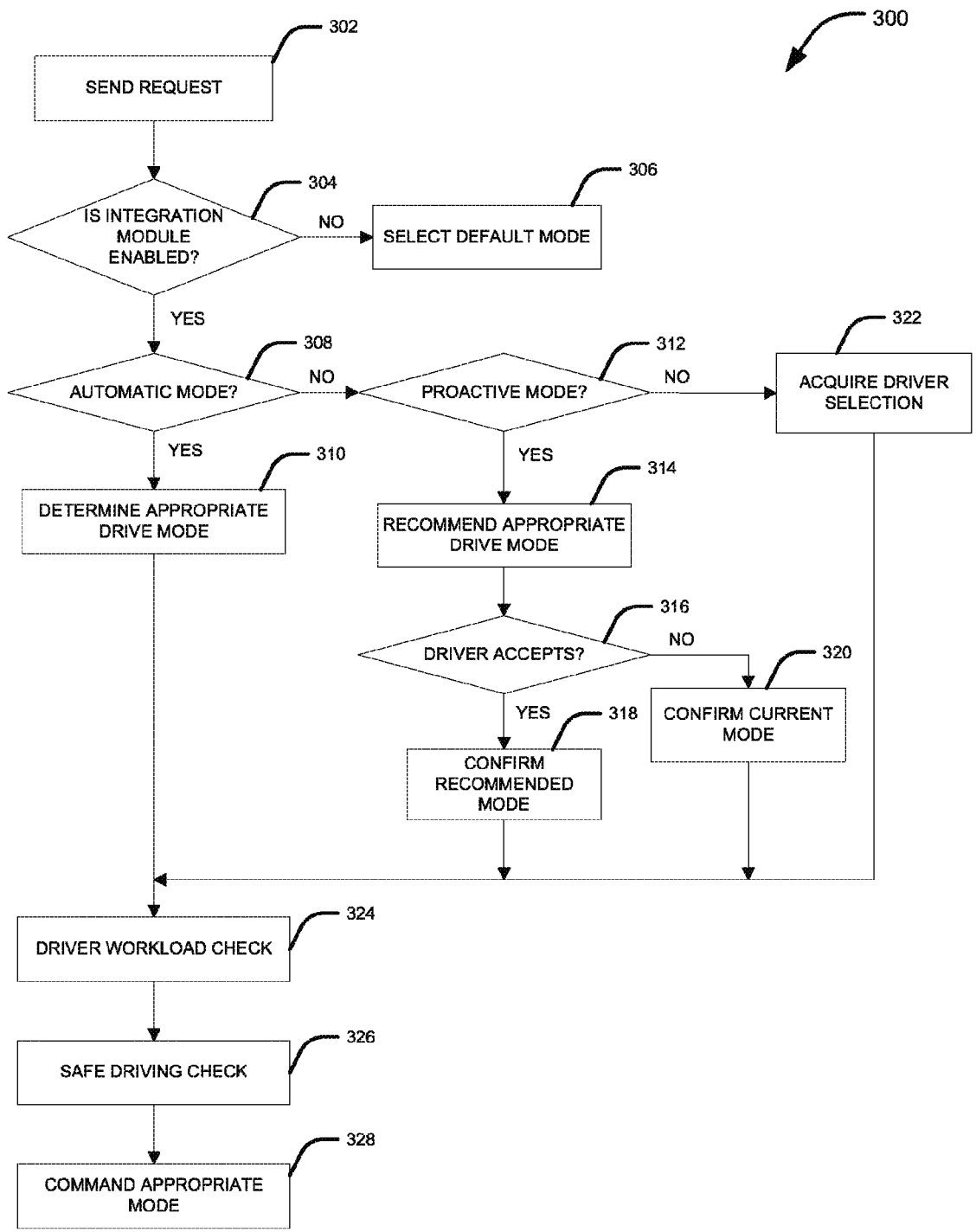
FIG. 3 illustrates an exemplary embodiment of a method for integrated vehicle control.

FIG. 3 outlines a method 300 for carrying out the subject matter of the present disclosure. The method 300 includes steps 302 to 326 describing a process for controlling vehicle control modules through an integrated interface that allows driver interaction and includes a decision logic to determine an appropriate driving mode. As discussed in FIG. 1, the integrated drive mode selection module 104 allows driver to either select a drive mode of preference or allows automatic determination of an appropriate driving mode using the automatic mode 104*b* or proactive mode 104*c*. The method 300 is discussed in connection with FIGS. 1 and 2; however, those skilled in the art will appreciate that the method 300 disclosure here may be operable within any vehicle having any other known control modules.

The method 300 begins at step 302, where the driver sends out a request for a drive mode selection. The integrated drive mode selection module 104 includes a user interface to receive driver's request, however, driver's request may only be executed through the integrated drive mode selection module 104 in case the system 100 is enabled. At step 304, the method 300 includes identifying whether the integrated drive mode selection module 104 is enabled. In case the module is not enabled, at step 306, the vehicle is allowed to run on the default settings for each of the control modules 102. Alternatively, the driver may select a setting for each of the control modules 102 individually.

In case the integrated drive mode selection module 104 is enabled, at step 308, the method 300 includes identifying whether the driver has selected the automatic mode 104*b*. If the automatic mode is selected, at step 310, an appropriate drive mode for the vehicle is determined. The drive mode can be initialized to the default state, or to the driver's most recent drive mode setting stored by the integrated drive mode selection module 104. The controller 106 evaluates the driving conditions 126 to determine the drive mode automatically using the decision logic 200 discussed in FIG. 2. As the driving conditions 126 keep varying with time, the automatic mode 104*b* ensures that the vehicle is operating at the most appropriate driving mode based on current driver, vehicle and surrounding scenarios.

In case the automatic mode is not selected, at step 312, the method 300 verifies whether the proactive mode is selected. Selection of the proactive mode 104*c* results in recommending the drive mode determined by the controller 106 at step 314. The proactive mode 104*c* uses the same decision logic 200 used by the automatic mode 104*b*, however, instead of automatically deciding the driving mode for the vehicle, the proactive mode recommends the determined driving mode to the driver. At step 316, the method 300 includes verifying whether the driver accepts the recommended drive mode. In case the driver accepts the recommendation, the determined mode is confirmed for vehicle operation at step 318. The driver may confirm the recommendation through a user interface having buttons or touch pad screen, or through voice commands. In other cases, the driver may not accept the recommendation, and subsequently at step 320, the current drive mode is maintained for the vehicle.

In case the driver has not selected the automatic mode 104*b* or proactive mode 104*c*, at step 322, the method 300 identifies the manually selected mode, and the vehicle is adapted to acquire the mode requested by the driver.

Once the drive mode for the vehicle is selected through the automatic mode 104*b*, proactive mode 104*c*, or driver's manual selection, the method 300 ensures an appropriate time to modify the current mode to the selected mode. At step 324, the method 300 checks for driver's current work load for the mode modification. In case the driver is currently under high workload (drive occupied in a phone call or in the middle of a turn), the mode modification may be delayed or reconsidered. The method 300 utilized the safety module 110 to ensure this safety feature to the driver and vehicle. In addition, the safety module 110 also verifies whether the selected mode is currently safe for driving, at step 326. The current vehicle conditions are monitored to check whether a mode modification is unsafe for the vehicle.

Finally, at step 328 commands corresponding to configuration settings for the control module 102 is transmitted. Activating the drive mode results in sending commands to the actuators of the control modules 102 to switch to the corresponding settings. The setting provided to each of the control module 102 may be common or different based on the computation of the decision logic 200.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A driving support system for a vehicle, the system comprising:
   a set of control modules configured for controlling the vehicle subsystems, each control module including at least one operational setting;
   an integrated drive mode selection module having a set of drive modes for modifying the settings for each of the control modules;
   a sensing system configured for identifying at least one condition associated with each of a driver, the vehicle, and surrounding objects or conditions;
   a safety module configured for ensuring that a selected drive mode is safe while driving; and
   a controller configured for determining an appropriate drive mode for the vehicle through an input, the controller determining the drive mode based on:
   the condition; and
   output of the safety module for the drive mode selected.

2. The system of claim 1, wherein the condition associated with the driver includes at least one of:
   control capability;
   intent;
   behavior; or
   workload.

3. The system of claim 1, wherein the input includes:
   driver's selection;
   an automatic mode which when activated automatically determines the drive mode for the vehicle; or
   a proactive mode which when activated determines the drive mode and recommends this drive mode for driver's acceptance.

4. The system of claim 1, wherein the modes includes:
   operational mode;
   automatic mode; and
   proactive mode.

5. The system of claim 1, wherein the safety module ensures that the selected drive mode is safe for the vehicle.

6. The system of claim 5, wherein the controller activates the selected drive mode based on the output of the safety module.

7. The system of claim 1, wherein the controller includes an arbitration module configured for:
   computing a confidence score based on drive mode identified for each condition; and
   determining an overall drive mode for the vehicle based on the confidence score associated with each condition; and
   selecting a setting for each control module based on the overall drive mode.

8. The system of claim 7, wherein the arbitration module selects a separate setting for each of the control modules.

9. The system of claim 1, wherein the arbitration module selects a common setting for each of the control modules.

* * * * *